Sept. 4, 1951     E. T. PETERSON     2,566,958
KICKOFF

Filed Dec. 15, 1945     3 Sheets-Sheet 1

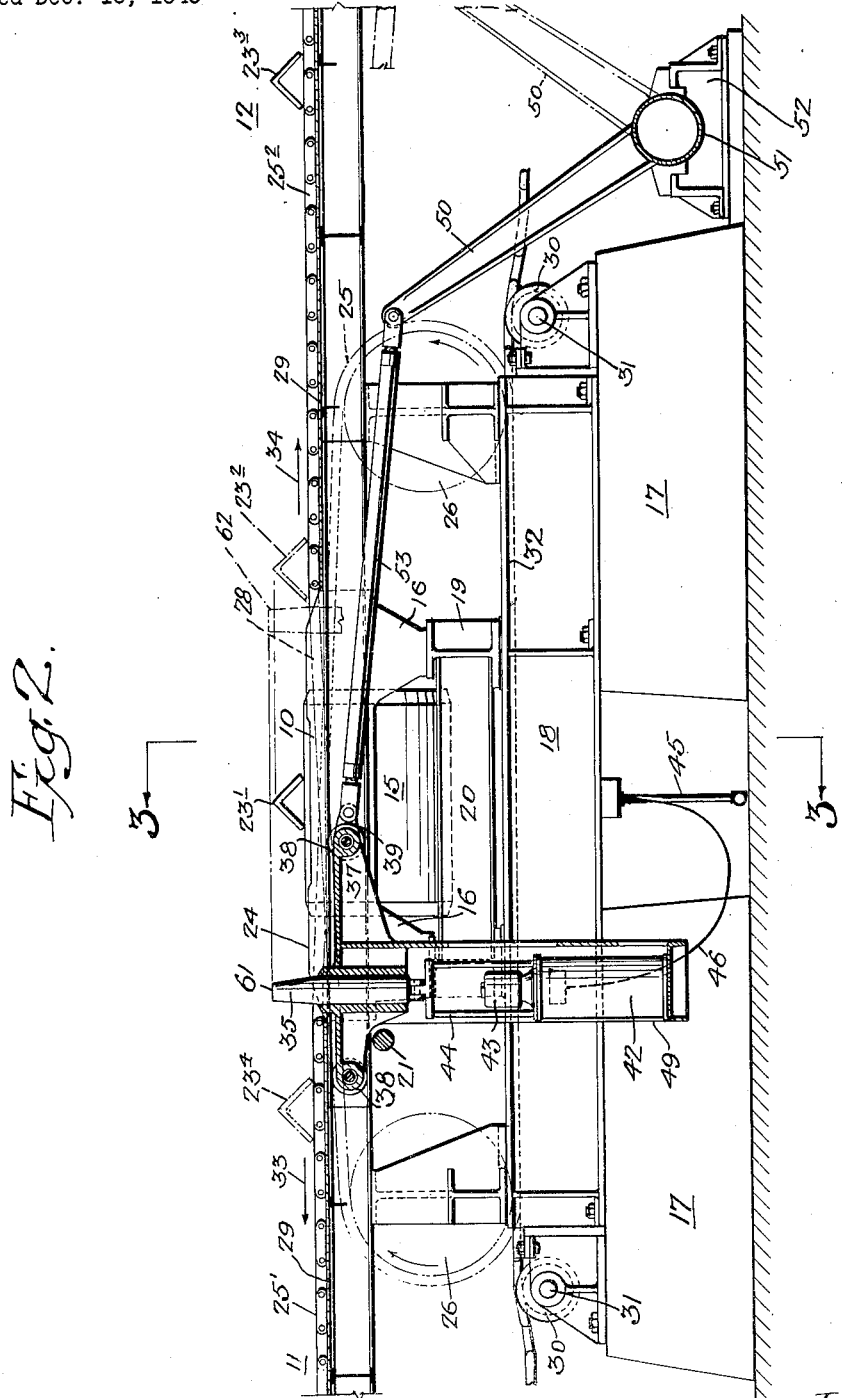

Sept. 4, 1951 E. T. PETERSON 2,566,958
KICKOFF
Filed Dec. 15, 1945 3 Sheets-Sheet 3
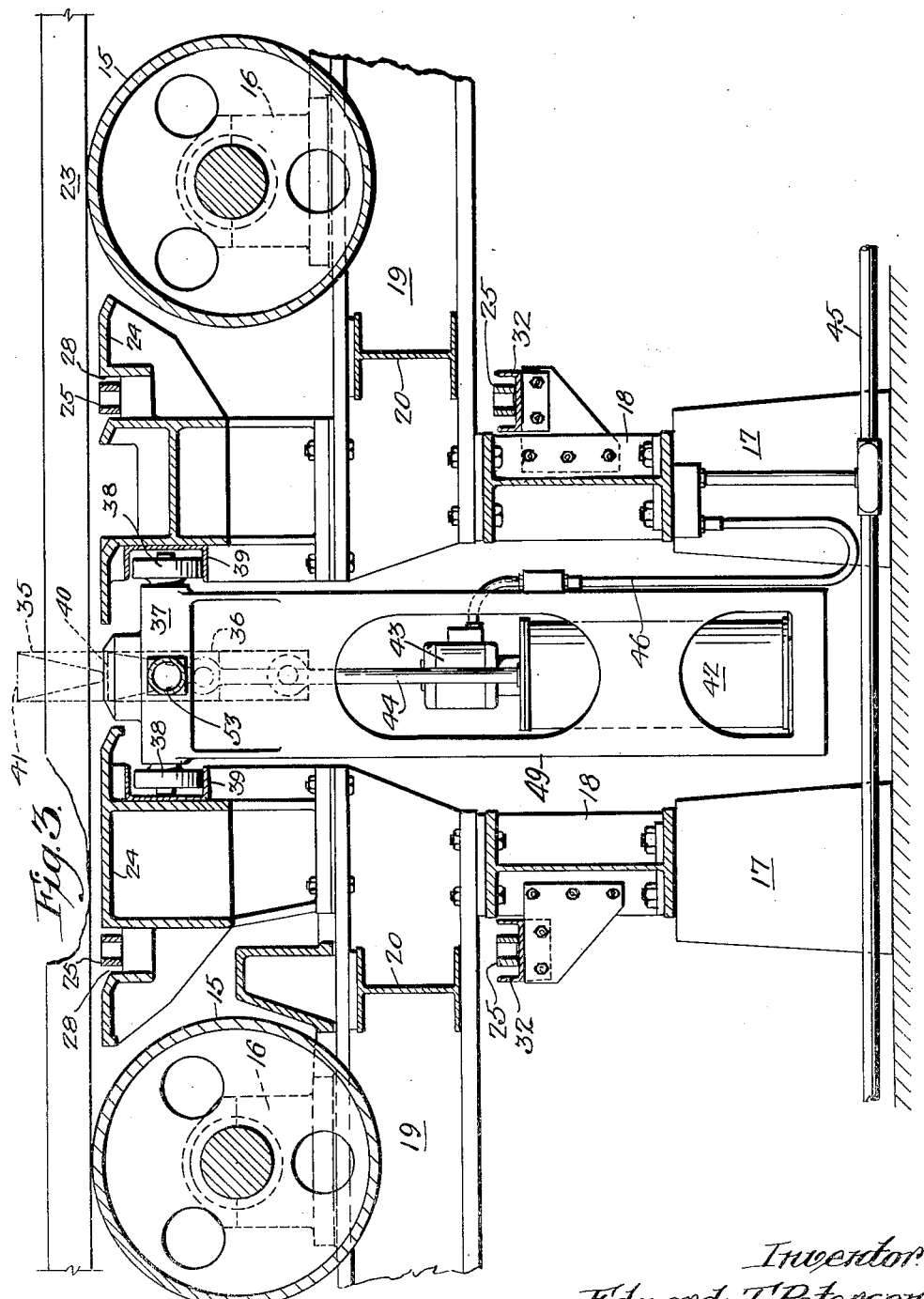

Patented Sept. 4, 1951

2,566,958

UNITED STATES PATENT OFFICE 2,566,958

KICKOFF

Edward T. Peterson, Reading, Pa., assignor to Birdsboro Steel Foundry and Machine Company, Birdsboro, Pa., a corporation of Pennsylvania Application December 15, 1945, Serial No. 635,363

5 Claims. (Cl. 214—1)

My invention relates to beds intended for inspection of structural steel shapes which are supplied on run-in rolls and which are diverted alternately to one or other of the beds as they come in, in order that different inspectors or two different sets of inspectors may examine them, doubling the inspection capacity of the plant.

A main purpose is to provide for movement of the shapes transversely of the lengths of the beds so as to start them on their way to deposit upon alternate inspection beds.

A further purpose is to operate an inspection bed service in which the shapes arrive on run-in rolls by diverting the shapes laterally in either direction while the shapes are resting stationary upon the run-in rolls or while the shapes are coming in on the rolls.

A further purpose is to provide a depressible dog in a carriage which moves in opposite directions, so that if the dog be depressed the carriage may be so placed as to lie on either side of a structural shape or shapes, with the result that when the carriage is operated it may divert the shape or shapes to either of two beds lying on opposite sides of a run-in path.

A further purpose is to throw a carriage to one side or the other as prefererd, and to lift an engaging dog in the carriage on one side or other of the positions of shapes, so as to throw the shapes to the left or to the right of a run-in path according to whether the dog is located to the right or to the left of the shape at the time the carriage mounting the dog is moved.

A further purpose is to provide inspection beds on opposite sides of a run-in path, with chains upon which shapes may be carried to and on the respective beds and to use a carriage and dog for the purpose of diverting or shifting shapes from the run-in path into engagement with one or other of the chains.

A further purpose is to increase the capacity for inspection of shapes handled by a run-in path so as to shift the shapes to different beds as desired, one on one side of and the other on the other side of the run-in path.

A further purpose is to bring all of the shapes into a central table before inspection, either stopping the shapes there and then shifting them laterally or diverting them from that point while they are still in motion upon the run-in rolls. In either event the shapes are shifted or—if they be still in motion—diverted by a kick-off to come to the right or the left for inspection.

Further purposes appear in the specification and in the claims.

In the drawings I have chosen to illustrate one only of the numerous embodiments in which my invention may appear, choosing the form shown from the standpoint of convenience in illustration, satisfactory operation and clear exemplification of the principles involved.

Figure 2 is a section of Figure 1 on the line 2—2.

Figure 3 is an enlarged section of Figure 2 on the line 3—3.

Like numerals refer to like parts throughout.

Figure 1:
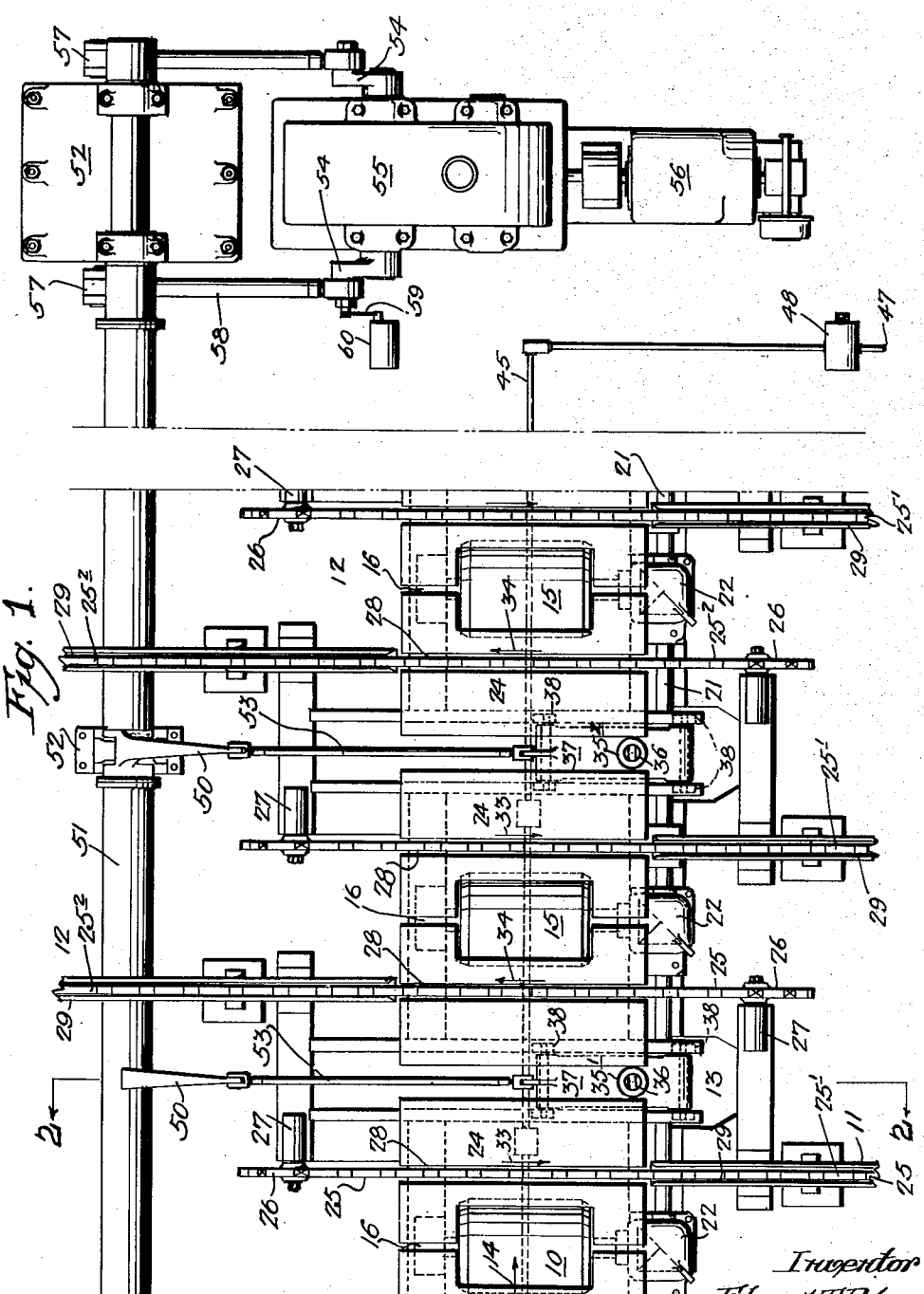
Figure 1 is a fragmentary plan view of the inventive structure.

Describing in illustration but not in limitation and referring to the drawings:

The kick off structure of the invention permits the operator to discriminate between structural shapes arriving from a rolling mill via a straightener on a run-in path 10, which are to go to an inspection bed 11 (to the left in Figure 2), and those which are to go to an inspection bed 12 (to the right in Figure 2). This distinction is made by a kick off 13 manipulated under the control of the operator.

The run-in path 10 may operate in either direction of the double headed arrow 14. This run-in path suitably consists of run-in rolls 15 turning in bearings 16 supported from piers 17 by girders 18 holding longitudinal beams 19 on which the bearings 16 rest. The beams 19 are cross-braced by spreaders 20. The run-in rolls are driven in either direction as desired by line shaft 21 connecting to the run-in rolls through gear boxes 22. The line shaft is driven at controllable speed, braked and stopped by means not shown.

Slightly below the level of the run-in rolls so as not to contact the structural shapes 23 being handled (Figure 3), I provide aprons 24 cut away as required for action of the rolls and other structure.

From the run-in path the structural shapes are transferred laterally to either inspection bed by continuously operating chains 25 driven in a suitable manner, not shown, over idler sprockets 26 on stub shafts 27. The sprockets are located below the level of the apron as shown in Figure 2, and the chains pass through slots 28 in the apron at or below its surface, and then rise into troughs 29 forming parts of the inspection beds. In the troughs 29, the chains ride along with their rough surfaces above the edges of the troughs, supporting and transferring the structural shapes 23 laterally.

Return of the chains is shown in Figure 2 over guide rollers 30 turning in bearings 31, and guided in troughs 32, shown in Figure 3.

It will thus be evident that chains 25' are moving toward inspection bed 11 in the direction of arrows 33, and chains 25² are moving toward inspection bed 12 in the direction of arrows 34. In order to transfer the structural shapes, it is merely necessary to kick them off the run-in path on to the chains 25 at the appropriate side of the run-in path.

My improved kick-off consists of a dog 35 operating in a guide 36 in a carriage 37 moving on rollers 38 in a track 39 below the apron. The dog 35 is moved up or down as required between the lower position 40 and the upper position 41 (Figure 3) by the action of a thrustor 42 of suitable commercial type, desirably an electrical-hydraulic system driven by a motor 43 as well known in the art. Connection to the dog 35 is suitably made by a piston rod 44. All of the thrustors 42 are driven electrically in unison through conduit 45 and flexible connections 46, connected to the power supply 47 by a master switch 48 under the control of the operator. The structural support of the thrustor is provided by a cradle 49 below the carriage 37.

Lateral movement of the dog 35 is provided by movement of the carriage by the action of rocker arm 50 on rocker shaft 51 in bearing stand 52. The rocker arm connects by link 53 with the carriage. The rocker shaft is turned by cranks 54 driven by speed reduction 55 from electric motor 56. The cranks connect to rockers 57 on the rocker shaft by links 58. On one crank 54 connection is made by a crank arm 59 with a limit switch 60 which turns off the motor 56 at the end of each half cycle of the crank arm 59, moving the dog 35 from the position 61 to the position 62 or vice versa.

It will be evident of course that while mechanism has been described to operate one dog 35, this will be duplicated along the length of the kick-off for as many dogs as may be required and that all will raise, lower and reciprocate in unison.

In operation, one or more structural shapes enter on the run-in paths. If the dogs are on the side opposite to the inspection bed to which it is desired to send these particular shapes, the switch 48 is moved to the position causing the thrustors to extend (if they are not already extended), raising the dogs, and the circuit of the motor 56 is closed, causing it to move the carriages to the opposite side of the run-in path, the dogs kicking the shapes off on to the chain conveyors of the inspection bed at that side. The operation will then be stopped by the limit switch 60.

If at the beginning of the operation the dogs were on the wrong side of the run-in path, the switch 48 will be operated to move the thrustors down (if they are not already down) and the motor 56 will operate to bring the carriages over to the correct side before raising the dogs and kicking off as above described.

Thus as shown in Figure 2, the dogs 35 in moving from the position 61 to 62, kick off the structural shape from the position 23' to the position 23². At 23³ I show a shape which was previously kicked off in the identical manner, while at 23⁴ I show a shape which was kicked off by movement of the dogs from the position 62 to the position 61.

It will be evident that the kick-off can be operated with or without stopping the forward movement of the structural shapes on the run-in table.

In view of my invention and disclosure variations and modifications to meet individual whim or particular need will doubtless become evident to others skilled in the art, to obtain all or part of the benefits of my invention without copying the structure shown, and I therefore, claim all such insofar as they fall within the reasonable spirit and scope of my claims.

Having thus described my invention what I claim as new and desire to secure by Letters Patent is:

1. In an inspection mechanism, a set of spaced run-in rolls, inspection beds one on either side of the run-in rolls having chain conveyors for laterally progressing shapes on the beds away from the set of rolls, each chain conveyor moving from a position between and below the run-in rolls toward its inspection table and across the same, carriages between rolls and below the level of their upper surfaces, means for guiding and moving the carriages in unison toward one or the other inspection bed as required, dogs supported on the carriages in the same lateral position on all carriages and having inactive positions below the level of the rolls, and electrical-hydraulic thrustors on the carriages for moving the dogs vertically upward in unison to a position above the level of the rolls, the carriages moving far enough laterally on each stroke to deposit a shape on the chain converyors when the dogs are raised.

2. In an inspection mechanism, a set of run-in rolls, inspection beds one on either side of the rolls, two sets of chain conveyors, one moving laterally from a position between and below the level of the rolls across one inspection bed and the other moving laterally from a position between and below the level of the rolls across the other inspection bed, carriages movable transversely between and below the level of the rolls to the effective portion of each chain conveyor on each inspection bed, dogs on the carriages having inactive positions below the level of the rolls, electrical-hydraulic thrustors on the carriages for raising and lowering the dogs in unison and means for moving the carriages back and forth in unison.

3. In mechanism for transfer of stock, a set of rolls, a bed to one side of the set of rolls, a plurality of transverse tracks beneath the tops of the rolls and arranged at intervals along the set of rolls, carriages below the tops of the rolls and transversely movable, one in each track, means common to all of the carriages for moving the carriages back and forth in unison, a vertical guide in each carriage, a dog vertically movable in each vertical guide and an electrical-hydraulic thrustor operatively connected to raise and lower each dog.

4. In mechanism for transfer of stock, a set of rolls, a bed to one side of the set of rolls, a set of transverse tracks beneath the top of the rolls, a carriage having rollers on the tracks and having a vertical cradle below and beneath the tracks, an electrical-hydraulic thrustor in the cradle set vertically, a vertical guide on the carriage above the thrustor and below the top of the set of rolls, a dog in the guide in one position below the top of the rolls and in another position extending above the top of the rolls, and crank means for reciprocating the carriage.

5. In mechanism for transfer of stock, a set of rolls, beds one laterally on either side of the set of rolls, conveyors on the beds each moving from a position below and between the rolls toward and across its bed, carriages between the rolls and below the tops thereof, means for guiding and moving the carriages transversely toward one or the other of the beds, a vertical guide supported on each carriage below the tops of the rolls, a dog slidable in each vertical guide, having a retracted position below the tops of the rolls and an extended position extending above the tops of the rolls, and mechanism mounted on each carriage and operatively connected to raise and lower the dogs.

EDWARD T. PETERSON.

REFERENCES CITED

The following references are of record in the file of this patent:

UNITED STATES PATENTS

| Number | Name | Date |
| --- | --- | --- |
| 278,511 | Critchlow | May 29, 1883 |
| 921,165 | Ross | May 11, 1909 |
| 942,644 | Huston | Dec. 7, 1909 |

FOREIGN PATENTS

| Number | Country | Date |
| --- | --- | --- |
| 4,236 | Great Britain | Apr. 7, 1885 |
| 486,340 | Germany | Nov. 14, 1929 |
| 505,195 | Germany | Aug. 15, 1930 |
| 563,386 | Germany | Nov. 8, 1932 |